US012631750B2

(12) United States Patent
Schoenlieb et al.

(10) Patent No.: US 12,631,750 B2
(45) Date of Patent: May 19, 2026

(54) METHOD AND APPARATUS FOR TIME-OF-FLIGHT SENSING OF A SCENE

(71) Applicant: Infineon Technologies AG, Neubiberg (DE)

(72) Inventors: Armin Josef Schoenlieb, Seiersberg-Pirka (AT); Hannes Plank, Graz (AT)

(73) Assignee: ifm group services gmbh, Tettnang (DE)

( * ) Notice: Subject to any disclaimer, the term of this patent is extended or adjusted under 35 U.S.C. 154(b) by 1029 days.

(21) Appl. No.: 17/825,434

(22) Filed: May 26, 2022

(65) Prior Publication Data

US 2022/0381912 A1 Dec. 1, 2022

(30) Foreign Application Priority Data

May 27, 2021 (DE) .......................... 102021113743.8

(51) Int. Cl.
*G01S 17/26* (2020.01)
*G01S 7/48* (2006.01)
*G01S 7/4865* (2020.01)

(52) U.S. Cl.
CPC ............ *G01S 17/26* (2020.01); *G01S 7/4808* (2013.01); *G01S 7/4866* (2013.01)

(58) Field of Classification Search
None
See application file for complete search history.

(56) References Cited

U.S. PATENT DOCUMENTS

| | | | |
|---|---|---|---|
| 2008/0239466 A1* | 10/2008 | Buettgen | H10F 77/933 257/E31.112 |
| 2016/0178734 A1* | 6/2016 | Kawamura | H04N 23/74 356/5.01 |

| | | | |
|---|---|---|---|
| 2018/0156907 A1* | 6/2018 | Cegla | G01S 15/105 |
| 2018/0180739 A1 | 6/2018 | Droz | |
| 2022/0035004 A1* | 2/2022 | Plank | G01S 7/4861 |
| 2024/0201341 A1* | 6/2024 | Siessegger | G01S 7/484 |

FOREIGN PATENT DOCUMENTS

| | | |
|---|---|---|
| DE | 102018131580 A1 | 6/2019 |
| EP | 2626722 A1 | 8/2013 |
| WO | 2019064062 A1 | 4/2019 |

OTHER PUBLICATIONS

Fisher, Brent, "Coded Modulation Discussion", Sense Photonics, Sep. 2020, pp. 1-6.
Jongenelen, Adrian P. P., et al., "Maximizing Precision Over Extended Unambiguous Range for TOF Range Imaging Systems", IEEE Instrumentation & Measurement Technology Conference Proceedings, 2010, pp. 1575-1580.

* cited by examiner

*Primary Examiner* — Eric L Bolda

(74) *Attorney, Agent, or Firm* — Murphy, Bilak & Homiller, PLLC

(57) ABSTRACT

A method for Time-of-Flight (ToF) sensing of a scene is provided. The method includes performing, by a ToF sensor, a plurality of first ToF measurements using a first modulation frequency to obtain first measurement values. A respective correlation function of each of the plurality of first ToF measurements is periodic and exhibits an increasing amplitude over distance within a measurement range of the ToF sensor. The method additionally includes determining a distance to an object in the scene based on the first measurement values.

17 Claims, 9 Drawing Sheets

100

| 102 | Performing a plurality of first ToF measurements |
|---|---|
| 106 | Performing a plurality of second ToF measurements |
| 104 | Determining a distance to an object |

200

210

202

201

230

240

203

220

METHOD AND APPARATUS FOR TIME-OF-FLIGHT SENSING OF A SCENE

TECHNICAL FIELD

The present disclosure relates to Time-of-Flight (ToF) sensing. In particular, examples relate to a method and an apparatus for ToF sensing of a scene.

BACKGROUND

A ToF camera measures distance by emitting near infrared light. For far range measurements (e.g. up to 50 m) strong light sources are used (e.g. output powers of 2.5 kW are used). In case an object occurs in the vicinity of the ToF camera, problems arise as the object may cause glare effects influencing neighboring pixels of the ToF camera. Furthermore, problems may arise as the pixels of the ToF camera saturate in case they receive too much light.

Hence, there may be a demand for improved ToF sensing.

SUMMARY

The demand may be satisfied by the subject matter described herein.

An example relates to a method for ToF sensing of a scene. The method comprises performing, by a ToF sensor, a plurality of first ToF measurements using a first modulation frequency to obtain first measurement values. A respective correlation function of each of the plurality of first ToF measurements is periodic and exhibits an increasing amplitude over distance within a measurement range of the ToF sensor. The method additionally comprises determining a distance to an object in the scene based on the first measurement values.

Another example relates to an apparatus for ToF sensing of a scene. The apparatus comprises a ToF sensor configured to perform a plurality of first ToF measurements using a first modulation frequency to obtain first measurement values. A respective correlation function of each of the plurality of first ToF measurements is periodic and exhibits an increasing amplitude over distance within a measurement range of the ToF sensor. Additionally, the apparatus comprises a processing circuit configured to determine a distance to an object in the scene based on the first measurement values.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
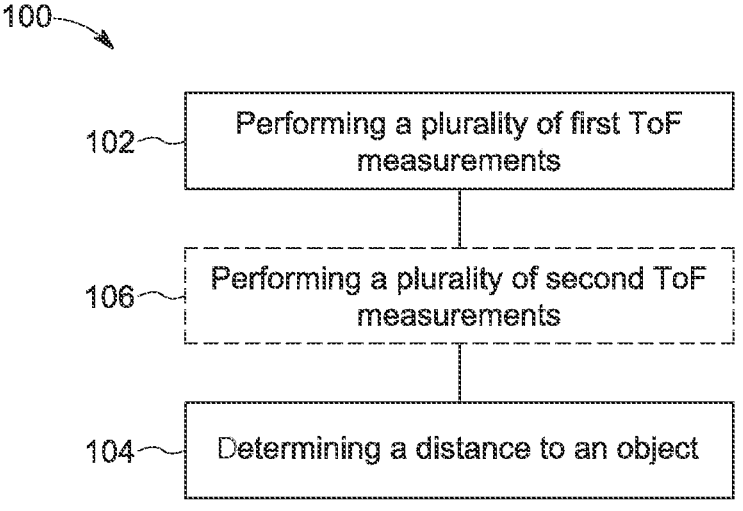
FIG. 1 illustrates a flowchart of an example of a method for ToF sensing of a scene.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 2:
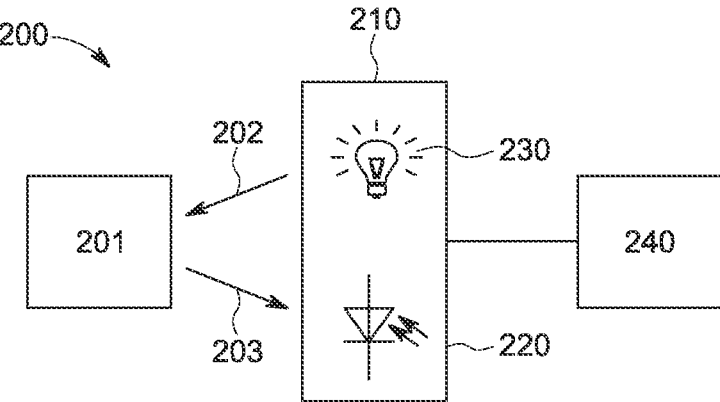
FIG. 2 illustrates an example of an apparatus for ToF sensing of a scene.

FIG. 1 illustrates a flowchart of an example of a method 100 for ToF sensing of a scene. The method 100 will be described in the following further with reference to FIG. 2 which illustrates an exemplary apparatus 200 for ToF sensing of a scene.

The apparatus 200 comprises a ToF sensor 210. The ToF sensor 200 comprises an illumination element (circuitry, device) 230 for emitting modulated light pulses (i.e. modulated light) 202 to the scene. An object 201 is located in the scene and reflects the emitted light pulses 202. The ToF sensor 200 additionally comprises a light capturing element (circuitry, device) 220 for capturing light 203 received from the scene. The light 203 includes the reflections of the emitted light pulses 202 by the object 201.

The illumination element 230 generates the modulated light pulses 202. The illumination element 230 may comprise any number of light sources. The illumination element 230 may, e.g., comprise one or more Light-Emitting Diodes (LEDs) and/or one or more laser diodes (e.g. one or more Vertical-Cavity Surface-Emitting Lasers, VCSELs) which are fired based on an illumination signal.

The light capturing element 220 may comprise various components such as e.g. optics (e.g. one or more lenses) and electronic circuitry. In particular, the electronic circuitry comprises an image sensor comprising at least one photosensitive element or pixel (e.g. comprising a Photonic Mixer Device, PMD, or a Charge-Coupled Device, CCD). For example, the image sensor may comprise a plurality of photo-sensitive elements or pixels. The at least one photosensitive element or pixel is driven based on a reference signal.

The method 100 comprises performing 102, by the ToF sensor 210, a plurality of first ToF measurements using a first modulation frequency to obtain first measurement values.

The illumination element 230 emits a respective sequence of modulated light pulses to the scene during the respective first ToF measurement. Further, a respective reference signal is used to drive the at least one photo-sensitive element or pixel of the light capture element 220 during the respective first ToF measurement. The first modulation frequency denotes the modulation frequency of the reference signal and the sequences of modulated light pulses emitted to the scene for the plurality of first ToF measurements.

Parameters of the ToF sensor 210 are adjusted such that a respective (light-intensity-independent) correlation function of each of the plurality of first ToF measurements is periodic and exhibits an increasing amplitude over distance within a measurement range of the ToF sensor. The respective (light-intensity-independent) correlation function gives the ToF sensor 210's distance-dependent correlation of the respectively received light 203 with the respective reference signal without considering (i.e. ignoring, not taking into account) the intensity of the light 203. In other words, the respective (light-intensity-independent) correlation function only describes the distance-dependency of the ToF sensor 210's output but not the dependency of the ToF sensor 210's output on the intensity of the received light 203.

The first modulation frequency $f_{mod1}$ may be defined by the speed of light c and the period length $d_{period1}$ of the (light-intensity-independent) correlation functions of the plurality of first ToF measurements:

$$f_{mod1} = \frac{c}{2 \cdot d_{period1}} \tag{1}$$

Figure 3:
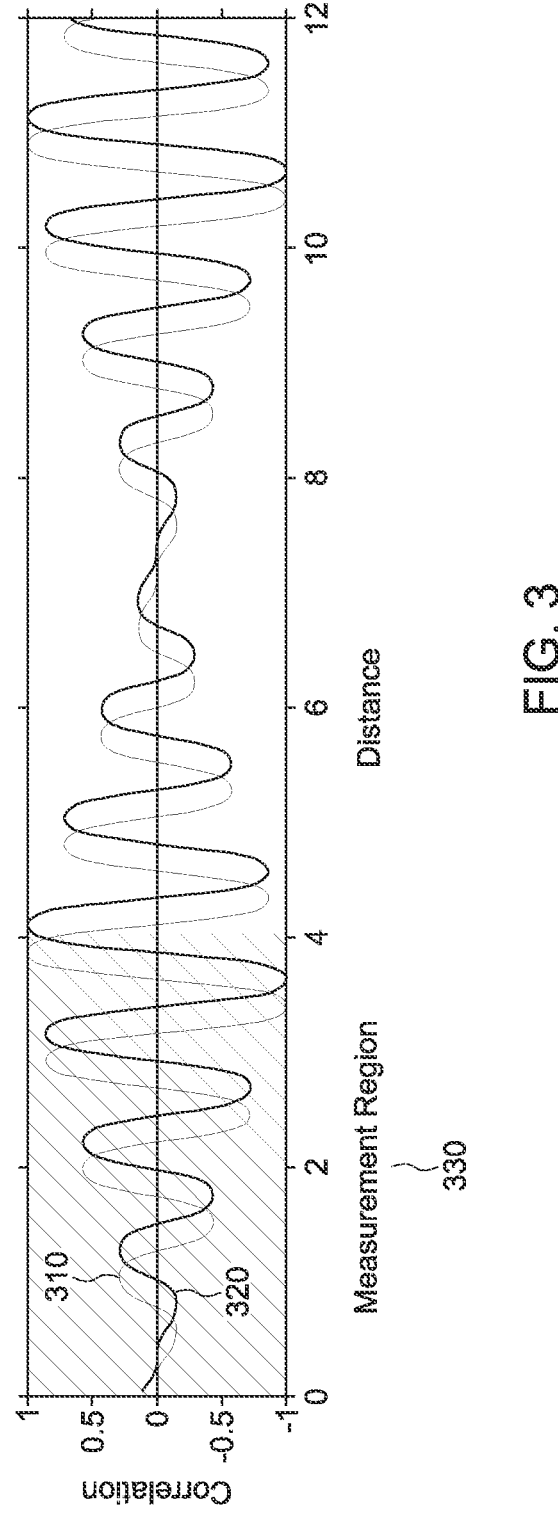
FIG. 3 illustrates exemplary correlation functions.

FIG. 3 illustrates two exemplary (light-intensity-independent) correlation functions 310 and 320 of two first ToF measurements by the ToF sensor 210. The abscissa of FIG. 3 denotes the distance between the ToF sensor 210 and the object 201. The ordinate denotes the value of the respective correlation function. Further illustrated in FIG. 3 is an exemplary measurement range 330 of the ToF sensor 210.

Both correlation functions 310 and 320 exhibit a sinusoidal, i.e. periodic, course (shape) with increasing amplitude over distance within the measurement range 330 of the ToF sensor 210. However, it is to be noted that correlation functions according to the proposed technique need not exhibit a sinusoidal course with increasing amplitude over distance within the measurement range of the ToF sensor 210. In general, the correlation functions may exhibit any type of periodic course with increasing amplitude over distance within the measurement range of the ToF sensor 210. For example, the correlations functions may alternatively exhibit a triangular course with increasing amplitudes of the triangles over distance within the measurement range of the ToF sensor 210.

The correlation functions 310 and 320 exhibit the same period length.

Due to the increasing amplitude of the correlation functions 310 and 320 within the measurement range 330 of the ToF sensor 210, the first ToF measurements are less sensitive to light 203 coming from the close proximity of the ToF sensor 210. In other words, the correlation functions 310 and 320 are shaped such that more correlation strength is given to distances (regions) further away from the ToF sensor 210. As a consequence, near distances (regions) get less correlation and far distances (regions) get higher correlation.

The light strength of reflections received from the object 201 in the scene is decreasing over the distance between the ToF sensor 210 and the object 201. For example, it may be assumed that the light strength decreases according to the inverse square law. That is, the distance-dependent light strength of the light 203 received at the ToF sensor 210 may be assumed as follows:

$$I(d) \propto \frac{1}{d^2} \tag{2}$$

with I denoting the light strength of the light received at the ToF sensor 210 and d denoting distance between the ToF sensor 210 and the object 201 reflecting the emitted light pulses 202 back to the ToF sensor 210.

As the sensitivity of the ToF sensor 210 for light from the close proximity of the ToF sensor 210 is reduced, saturation of the one or more photo-sensitive elements or pixels of the light capture element 220 due to strong reflections from the close proximity of the ToF sensor 210 may be avoided. Additionally, glare effects caused by reflections of the emitted light pulses 202 by an object in the close proximity of the ToF sensor 210 may be omitted or at least reduced.

The output of the ToF sensor 210 for a ToF measurement scales with the light strength of reflections received from the object 201. For example, the first measurement value output by the ToF sensor 210 for one of the plurality of first ToF measurements may be determined by the product of the light strength of the reflections received from the object 201 during this ToF measurement and the value of the ToF measurement's (light-intensity-independent) correlation function at the distance of the object 201 causing the received reflections.

Further, the periodic course of the correlation functions allows to determine the distance between the ToF sensor 210 and the object 201 according to standard approaches. Referring back to FIG. 1, the method 100 further comprises determining 104 a distance to the object 201 in the scene based on the first measurement values.

In particular, the first measurement values allow to determine a respective phase shift between the respective reference signal used for driving the at least one photo-sensitive element or pixel of the light capture element 220 during the respective first ToF measurement and the respective light 203 (i.e. the reflections of the emitted light pulses 202 caused by the object 201) received from the scene by the light capture element 230 during the respective first ToF measurement.

For example, in case two first ToF measurements are performed, the phase shift p may be determined as follows:

$$\varphi = a\tan2\left(\frac{C_2}{C_1}\right) \tag{3}$$

with $C_1$ and $C_2$ denoting the first measurement values of the two first ToF measurements.

In case four first ToF measurements are performed, the phase shift V may be determined as follows:

$$\varphi = a\tan2\left(\frac{C_2 - C_4}{C_1 - C_3}\right) \tag{4}$$

with $C_1$, $C_2$, $C_3$ and $C_4$ denoting the first measurement values of the four first ToF measurements.

It is to be noted that different time offsets are used respectively for the plurality of first ToF measurements between the respective sequence of modulated light pulses 202 emitted to the scene during the respective first ToF measurement and the respective reference signal used to drive the light capture element 220 of the ToF sensor 210 during the respective first ToF measurement. The time offsets used for the first ToF measurements are integer multiples of a fraction of a first period length $T_1$ given by the inverse of the first modulation frequency $f_{mod1}$, that is:

$$T_1 = \frac{1}{f_{mod1}} \tag{5}$$

For example, time offsets $n \cdot T_1/4$ with n=0, 1 may be used in case two first ToF measurements are performed. Similarly, time offsets $n \cdot T_1/4$ with n=0, 1, 2, 3 may be used in case four first ToF measurements are performed. The sequences of modulated light pulses 202 emitted to the scene during the first ToF measurements may be identical. Accordingly, the reference signals used for the first ToF measurements may time shifted by $n \cdot T_1/4$. The first measurement values $C_1$ are related to the parameter n as follows:

$$i = n+1 \tag{6}$$

The correlation functions 310 and 320 illustrated in FIG. 3 are shifted with respect to each other due to the different time offsets.

Performing four first ToF measurements instead of two first ToF measurements may allow to omit errors related to the least one photo-sensitive element or pixel of the light capture element 220. For example, gain errors or errors due to background light may be compensated. The error compensation is possible as two pairs of ToF measurements are performed with inverted reference signals (the reference signals for n=0, 2 are inverted with respect to each other and the reference signals for n=1, 3 are inverted with respect to each other) such that the differences $C_2$-$C_4$ and $C_1$-$C_3$ cancel out these errors. However, it is to be noted that the present technology is not limited to performing two or four first ToF measurements. In general, any number I≥2 of ToF measurements may be performed.

The distance d of the ToF sensor 210 to the object 201 may be determined based on the phase shift φ as follows:

$$d = \frac{c}{2} \cdot \frac{\varphi}{2\pi \cdot f_{mod1}} \tag{7}$$

The apparatus 200 comprises an accordingly configured processing circuit 240, which is coupled to the ToF sensor 210. For example, the processing circuit 240 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit 240 may optionally be coupled to, e.g., read only memory (ROM) for storing software, random access memory (RAM) and/or non-volatile memory. The processing circuit 240 is configured to determine the distance to the object 201 in the scene based on the first measurement values.

For example, the processing circuit 240 may further output data indicative of the distance to the object 201 (e.g. a two-dimensional depth image or a three-dimensional point cloud).

The apparatus 200 may comprise further hardware—conventional and/or custom.

The method 100 as well as the apparatus 200 may allow to determine the distance to the object 201 in the scene while omitting glare effects and saturation of the one or more photo-sensitive elements or pixels of the light capture element 220. In other words, the method 100 and the apparatus 200 may allow improved ToF sensing.

The course (shape) of the (light-intensity-independent) correlation functions of the plurality of first ToF measurements may be adjusted by means of the emitted modulated light pulses and the reference signals used for driving the light capture element 220. This will be described in the following for one of the first ToF measurements with respect to FIGS. 4 to 7. It is to be noted that the aspects described in the following may be used as well for the other first ToF measurements.

As indicated above, a sequence of modulated light pulses 202 is emitted to the scene when performing the ToF measurement. The sequence of modulated light pulses is a succession of light pulse sub-sequences of a first type and light pulse sub-sequences of a second type according to a modulation code. The light pulse sub-sequences of the first type and the light pulse sub-sequences of the second type are different from each other. In particular, the light pulse sub-sequences of the first type each comprise light pulses at first positions of the respective light pulse sub-sequence of the first type. The light pulse sub-sequences of the second type each comprise light pulses only at positions of the respective light pulse sub-sequence of the second type that are different from the first positions. For example, the light pulse sub-sequences of the first type may each comprise light pulses only at odd positions of the respective light pulse sub-sequence of the first type, whereas the light pulse sub-sequences of the second type may each comprise light pulses only at even positions of the respective light pulse sub-sequence of the second type, or vice versa.

Figure 4:
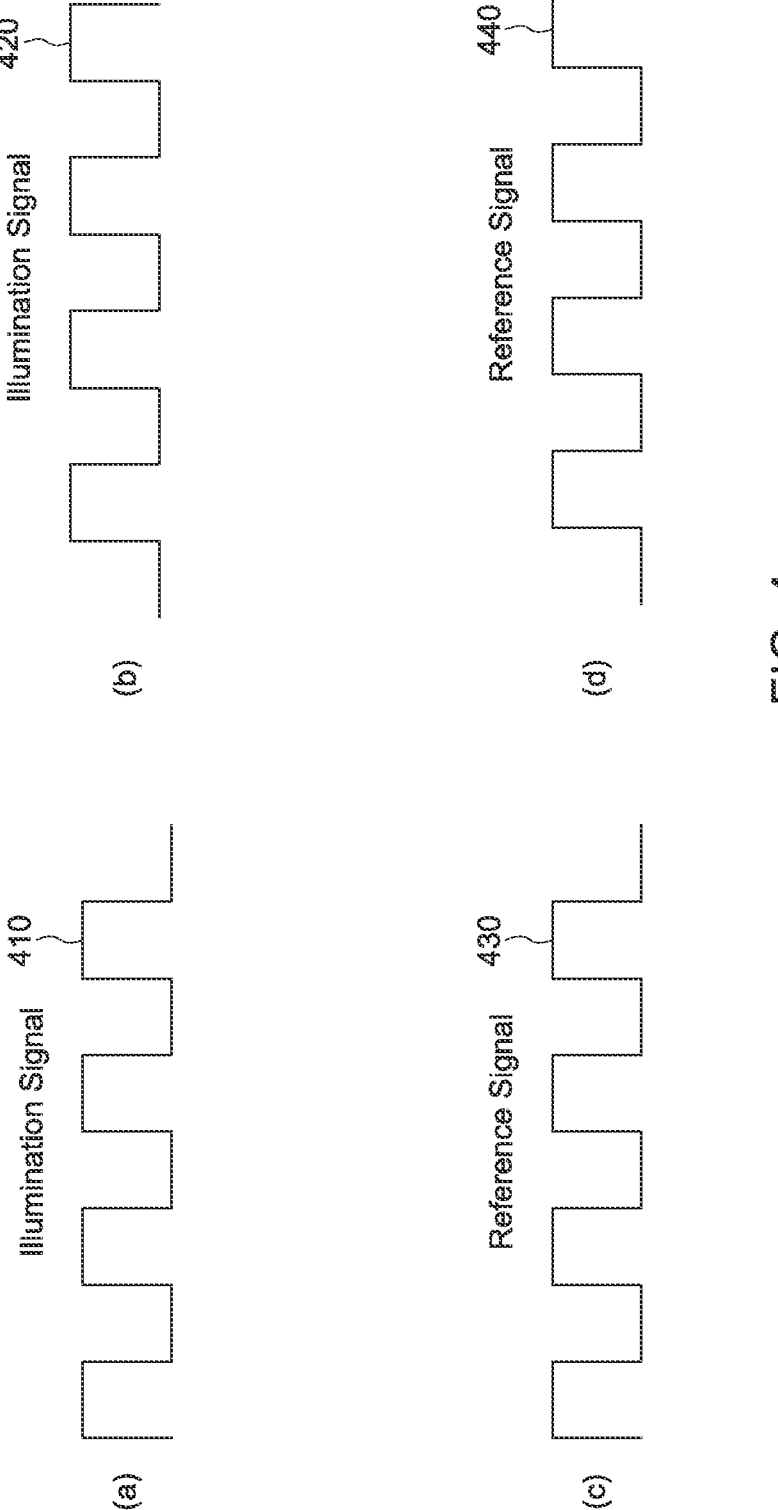
FIG. 4 illustrates exemplary sequences.

FIG. 4 illustrates in subfigure (a) an exemplary first sequence 410 of the illumination signal according to which the illumination element 230 emits light pulses 202 to the scene. Each high pulse in the first sequence 410 of the illumination signal corresponds to a light pulse in light pulse sub-sequence of the first type. Similarly, FIG. 4 illustrates in subfigure (b) an exemplary second sequence 420 of the illumination signal according to which the illumination element 230 emits light pulses 202 to the scene. Each high pulse in the second sequence 420 of the illumination signal corresponds to a light pulse in light pulse sub-sequence of the second type. As can be seen from subfigures (a) and (b) of FIG. 4, the first sequence 410 of the illumination signal comprises high pulses only at odd positions (i.e. pulses at positions/time slots 1, 3, 5, . . . are high pulses) and the second sequence 420 of the illumination signal comprises high pulses only at even positions (i.e. pulses at positions/time slots 2, 4, 6, . . . are high pulses) such that the correspondingly emitted light pulse sub-sequence of the first type comprises light pulses only at odd positions and the correspondingly emitted light pulse sub-sequence of the second type comprises light pulses only at even positions. In other words, the light pulse sub-sequence of the second type comprises light pulses only at positions that are different from the positions of the light pulses in the light pulse sub-sequence of the first type. In the example of FIG. 4, the light pulse sub-sequence of the second type is inverted with respect to the light pulse sub-sequence of the first type.

Each of the first sequence 410 of the illumination signal and second sequence 420 of the illumination signal exhibits a respective alternating series of high and low pulses of equal duration (length). Therefore, each of the light pulse sub-sequence of the first type and the light pulse sub-sequences of the second type is a respective series of light pulses with equal pulse length (duration) and equal pulse spacing. Accordingly, the sequences 410 and 420 of the illumination signal and, hence, the individual light pulse sub-sequences of the first type and the second type may be understood as Continuous Wave (CW) segments.

Figure 5:
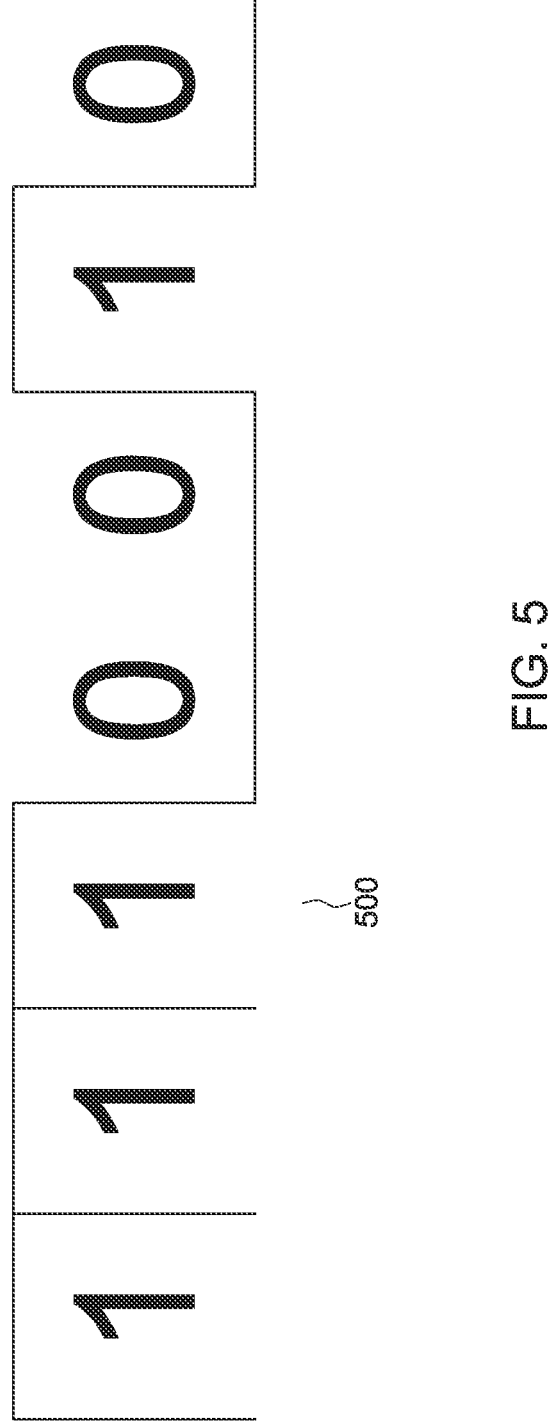
FIG. 5 illustrates an example of a modulation code.

As described above, the light pulse sub-sequences of the first type and the light pulse sub-sequences of the second type are emitted successively according to a modulation code. An exemplary modulation code 500 is illustrated in FIG. 5. The modulation code 500 is a Barker code (sequence). However, the proposed technique is not limited thereto. Other modulation codes like pseudo-random sequences such as Kasami code sequences or maximum length sequences (m-sequences) may be used as well.

The Barker code illustrated in FIG. 1 is 1110010. Each "1" in the Barker code denotes the light pulse sub-sequence of the first type (i.e. the first sequence 410 of the illumination signal) and each "0" in the Barker code denotes the light pulse sub-sequence of the second type (i.e. the second sequence 420 of the illumination signal). Accordingly, the light pulse sub-sequence of the first type is emitted three times in a row, then the light pulse sub-sequence of the second type is emitted two times in a row, then the light pulse sub-sequence of the first type is emitted once, and finally the light pulse sub-sequence of the second type is emitted once. In other words, the light pulse sub-sequences of the first type and the light pulse sub-sequences of the second type are concatenated according to the modulation code selected for the ToF measurement.

The light pulse sub-sequences of the first type and the light pulse sub-sequences of the second type exhibit the same duty cycle. The duty cycle may be selected as desired. For example, the duty cycle may be 25%. However, also lower or higher values for the duty cycle may be used. The duty cycle of a signal denotes the fraction of one period during which the signal is active. For example, the duty cycle of a light pulse sub-sequence of the first type denotes the ratio of the summed durations of the light pulses in the light pulse sub-sequence of the first type to the total period (duration) of the light pulse sub-sequence of the first type. The duty cycle of a light pulse sub-sequence of the second type analogously denotes the ratio of the summed durations of the light pulses in the light pulse sub-sequence of the second type to the total period (duration) of the light pulse sub-sequence of the second type.

Referring back to FIG. 4, the light capture element 220 of the ToF sensor 210 is driven based on the reference signal when performing the ToF measurement. Similar to what is described above for the emitted sequence of modulated light pulses, the reference signal comprises a succession of electric pulse sequences of a first type and electric pulse sequences of a second type according to the modulation code. The electric pulse sequences of the first type and the electric pulse sequences of the second type are different from each other. In particular, the electric pulse sequences of the first type each comprise high pulses at second positions of the respective electric pulse sequence of the first type. The electric pulse sequences of the second type each comprise high pulses only at positions of the respective electric pulse sequence of the second type that are different from the second positions. For example, the electric pulse sequences of the first type may each comprise high pulses only at odd positions of the respective electric pulse sequence of the first type, whereas the electric pulse sequences of the second type may each comprise high pulses only at even positions of the respective electric pulse sequence of the second type, or vice versa. FIG. 4 illustrates in subfigure (c) an exemplary electric pulse sequence 430 of the first type and in subfigure (d) an exemplary electric pulse sequence 440 of the second type. As can be seen from subfigures (c) and (d) of FIG. 4, the electric pulse sequence 430 of the first type comprises high pulses only at odd positions (i.e. pulses at positions/time slots 1, 3, 5, . . . are high pulses) and the electric pulse sequence 440 of the second type comprises high pulses only at even positions (i.e. pulses at positions/time slots 2, 4, 6, . . . are high pulses). In other words, the electric pulse sequence 440 of the second type comprises high pulses only at positions that are different from the positions of the high pulses in the electric pulse sequence 430 of the first type. In the example of FIG. 4, the electric pulse sequence 440 of the second type is inverted with respect to the electric pulse sequence 430 of the first type.

The light capture element 220 of the ToF sensor 210 is successively driven based on the electric pulse sequences 430 of the first type and electric pulse sequences 440 of the second type according to the modulation code. Referring back to the example of FIG. 5, the "1" in the Barker code denotes the electric pulse sequence 430 of the first type and the "0" denotes the electric pulse sequence 440 of the second type. Accordingly, light capture element 220 of the ToF sensor 210 is driven three times in a row based on the electric pulse sequence 430 of the first type, then two time in a row based on the electric pulse sequence 440 of the second type, then one time based on the electric pulse sequence 430 of the first type, and finally one time based on the electric pulse sequence 430 of the first type. In other words, the electric pulse sequences 430 of the first type and electric pulse sequences 440 of the second type are concatenated according to the modulation code selected for the ToF measurement.

It is to be noted that the length of the sequences 410 and 420 of the illumination signal, the length of the electric pulse sequences 430 and 440 as well as the length of the modulation code 500 are merely exemplary. The number of light pulses in the light pulse sub-sequences of the first and second type, the number electric pulses in the electric pulse sequences of the first and second type as well as the length of the used modulation codes may be longer or shorter than what is illustrated in FIGS. 4 and 5. For example, the number of light pulses in exemplary light pulse sub-sequences of the first and/or second type or exemplary and/or the number electric pulses in exemplary electric pulse sequences of the first and/or second type may be u times the number of pulses illustrated in FIG. 4. Similarly, the length of an exemplary modulation code may be v times the length of the modulation code 500.

According to the example of FIG. 4, the light pulse sub-sequence of the first type and the light pulse sub-sequence of the second type comprise the same number of light pulses. In other examples, the light pulse sub-sequences of the first type may each comprise a first number of light pulses, whereas at least one of the light pulse sub-sequences of the second type may comprise a second number of light pulses different from the first number of light pulses. The other light pulse sub-sequences of the second type may comprise the first number of light pulses. For example, one or more of the light pulse sub-sequences of the second type may comprise more or less light pulses than the light pulse sub-sequence of the first type. In other words, at least some of light pulse sub-sequences of the second type may have a different length than the light pulse sub-sequences of the first type. Varying the length of at least some of light pulse sub-sequences of the second type may together with the design of the modulation code allow to shape the increase of the (light-intensity-independent) correlation function's amplitude. For example, the increase of the (light-intensity-independent) correlation function's amplitude may be adjusted to counteract the decrease in light intensity over distance. In other words, the amplitude of the periodic correlation function may increase quadratically over distance.

The number of light pulses in each of the light pulse sub-sequences of the first type may be identical to the number of high pulses of the electric pulse sequences of the first type similar to what is illustrated in FIG. 4. In FIG. 4, the first sequence 410 of the illumination signal, which is correspondent to the light pulse sub-sequence of the first type, exhibits the same number of pulses as the electric pulse sequence 430 of the first type. Analogously, the number of light pulses in each of the light pulse sub-sequences of the second type may be identical to the number of high pulses of the electric pulse sequences of the second type as illustrated in FIG. 4. In FIG. 4, the second sequence 420 of the illumination signal, which is correspondent to the light pulse sub-sequence of the second type, exhibits the same number of pulses as the electric pulse sequence 440 of the second type.

In other examples, at least one of the light pulse sub-sequences of the first type may comprise a number of light pulses that is smaller than a respective number of high pulses in the electric pulse sequences of the first type. Additionally or alternatively, at least one of the light pulse sub-sequences of the second type may comprise a number of light pulses that is smaller than a respective number of high pulses in the electric pulse sequences of the second type. This is illustrated in FIG. 6.

Figure 6:
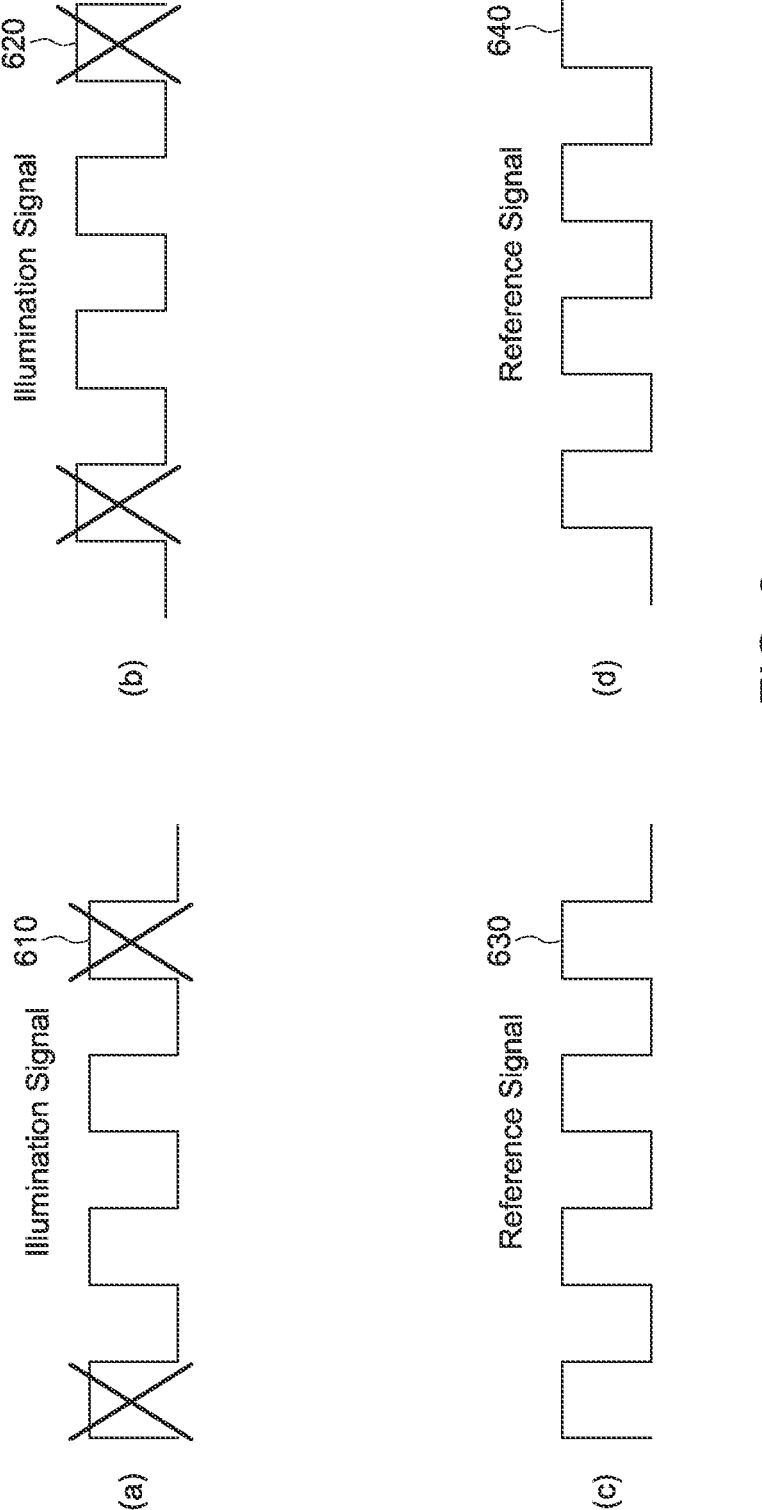
FIG. 6 illustrates exemplary sequences.

Similar to FIG. 4, FIG. 6 illustrates in subfigure (a) an exemplary first sequence 610 of the illumination signal according to which the illumination element 230 emits light pulses 202 to the scene. Each high pulse in the first sequence 610 of the illumination signal corresponds to a light pulse in light pulse sub-sequence of the first type. Analogously, FIG. 6 illustrates in subfigure (b) an exemplary second sequence 620 of the illumination signal according to which the illumination element 230 emits light pulses 202 to the scene. Each high pulse in the second sequence 620 of the illumination signal corresponds to a light pulse in light pulse sub-sequence of the second type. Like the sequence 410 and 420 of the illumination signal, also the sequences 610 and 620 of the illumination signal are different from each other such that also the correspondingly emitted light pulse sub-sequences of the first type and the correspondingly emitted light pulse sub-sequences of the second type are different each other. In particular, the first sequence 610 of the illumination signal comprises high pulses only at odd positions (i.e. pulses at positions/time slots 3 & 5 are high pulses) and the second sequence 420 of the illumination signal comprises high pulses only at even positions (i.e. pulses at positions/time slots 4 & 6 are high pulses) such that the correspondingly emitted light pulse sub-sequence of the first type comprises light pulses only at odd positions and the correspondingly emitted light pulse sub-sequence of the second type comprises light pulses only at even positions. In other words, the light pulse sub-sequence of the second type comprises light pulses only at positions that are different from the positions of the light pulses in the light pulse sub-sequence of the first type.

In comparison to the sequences 410 and 420 of the illumination signal, the first high pulse and the last high pulse is skipped (omitted) in the sequences 610 and 620 of the illumination signal.

Similar to FIG. 4, FIG. 6 illustrates in subfigure (c) an exemplary electric pulse sequence 630 of the first type and in subfigure (d) an exemplary electric pulse sequence 640 of the second type. The electric pulse sequence 630 and 640 illustrated in FIG. 6 are identical to the electric pulse sequence 430 and 440 illustrated in FIG. 4.

The number of pulses in the first sequence 610 of the illumination signal and, hence, the number of light pulses in the light pulse sub-sequence of the first type is smaller than the number of high pulses in the electric pulse sequence 630 of the first type. Analogously, the number of pulses in the second sequence 620 of the illumination signal and, hence, the number of light pulses in the light pulse sub-sequence of the second type is smaller than the number of high pulses in the electric pulse sequence 640 of the second type.

Accordingly, a time span from a beginning of the light pulse sub-sequence of the first type to the first light pulse in the light pulse sub-sequence of the first type is longer than a time span from a beginning of the electric pulse sequence 630 of the first type to the first high pulse in the electric pulse sequence 630 of the first type. Analogously, a time span from the last light pulse in the light pulse sub-sequence of the first type to an end of light pulse sub-sequence of the first type is longer than a time span from the last high pulse in the electric pulse sequence 630 of the first type to an end of the electric pulse sequence 630 of the first type. The same holds true for the light pulse sub-sequence of the second type and the electric pulse sequence 640 of the second type.

Using this relation between the light pulse sub-sequences and the electric pulse sequences may allow to shape the (light-intensity-independent) correlation function of the ToF Measurement. This is exemplarily illustrated in FIG. 7.

Figure 7:
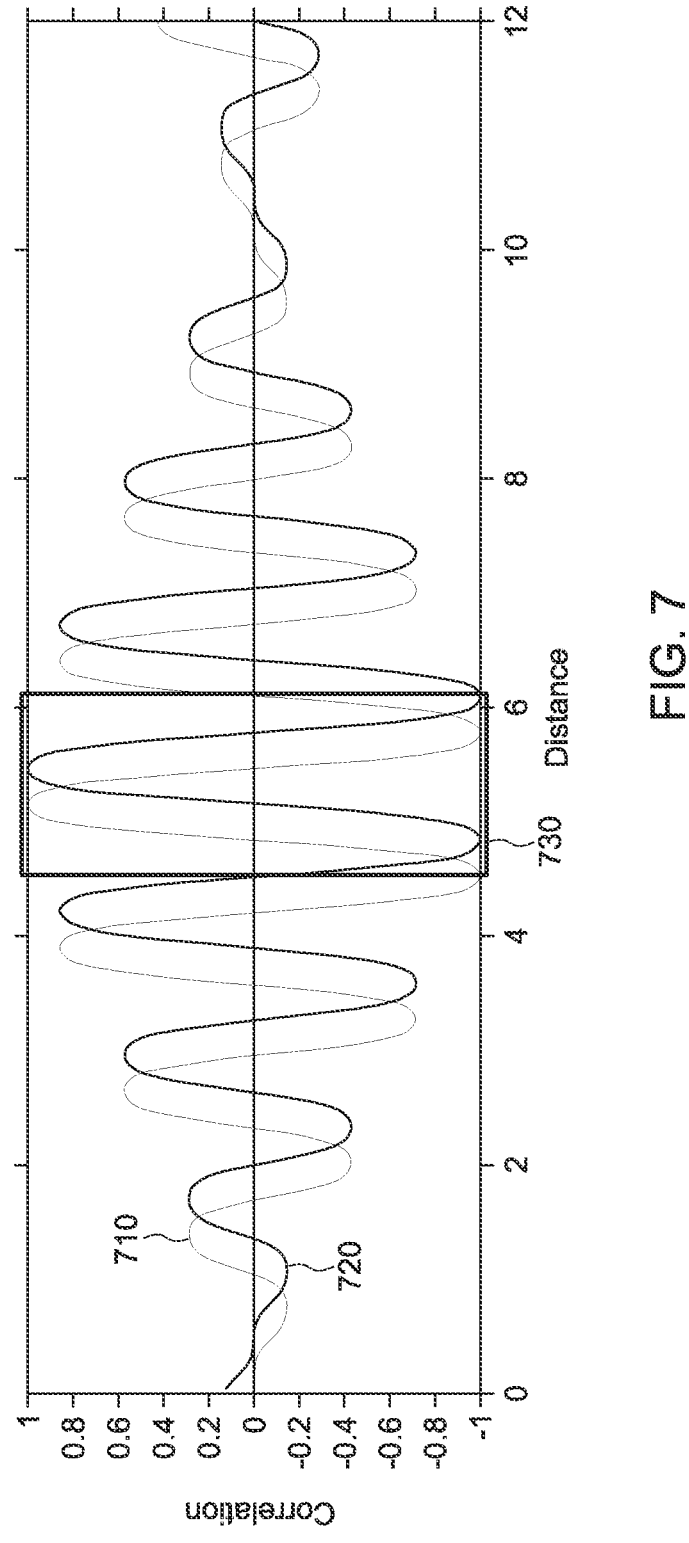
FIG. 7 illustrates exemplary correlation functions.

FIG. 7 illustrates two exemplary (light-intensity-independent) correlation functions 710 and 720 of two first ToF measurements by the ToF sensor 210. The light pulse sub-sequences and the electric pulse sequences as illustrated in FIG. 6 are used for the two first ToF measurements. The abscissa of FIG. 7 denotes the distance between the ToF sensor 210 and the object 201. The ordinate denotes the value of the respective correlation function. The measurement range of the ToF sensor 210 is not explicitly illustrated in FIG. 7, but ranges from 0 to approx. 6.1 on the ordinate.

Like the correlation functions 310 and 320 illustrated in FIG. 3, also the correlation functions 710 and 720 exhibit a sinusoidal, i.e. periodic, course (shape) with increasing amplitude over distance within the measurement range of the ToF sensor 210.

However, compared to the correlation functions 310 and 320, the correlation functions 710 and 720 exhibit one full period (swing) of maximum correlation. In the distance region 730, each of the correlation functions 710 and 720 exhibits one full period of maximum correlation. Using correlation functions providing maximum correlation over a full period may be beneficial for, e.g., long distance ToF sensing as the received light strength may be limited for longer ranges. Accordingly, skipping the first and the last light pulse in at least some of light pulse sub-sequences of the first and second type may allow improved ToF sensing at longer distance ranges.

However, it is to be noted that the proposed technique is not limited to only skipping the first and the last light pulse in one or more of the light pulse sub-sequences of the first and second type. Other pulses may be skipped as well in one or more of the light pulse sub-sequences of the first and second type. The illumination elements used for ToF sensing are becoming more and more powerful in terms of light intensity of the emitted light pulses 202. In order to comply with, e.g., eye safety regulations, the amount of light emitted per unit time by an illumination element such as the illumination element 230 for a ToF measurement may be limited. Pulses in the light pulse sub-sequences of the first and second type may, hence, be skipped to limit the amount of emitted light. For example, between 10% to 90% of the pulses may be skipped.

Also in this case each of the light pulse sub-sequences of the first type and the light pulse sub-sequences of the second type exhibits a respective series of light pulses of equal pulse length. However, the pulse spacing to a directly neighboring light pulse is (2·m+1) times the pulse length for one or more of the light pulses in the respective series of light pulses, wherein m≥1. The pulse spacing to the directly neighboring light pulse is equal to the pulse length (i.e. m=0) for the other light pulses in the respective series of light pulses.

Another aspect for ToF sensing is the ambiguity of the ToF measurement. The maximum unambiguous distance range $d_u$ of a ToF measurement is inversely proportional to the modulation frequency $f_{mod}$:

$$d_u = \frac{c}{2 \cdot f_{mod}} \tag{8}$$

Objects measured beyond this distance are wrapped around to fall in the range $[0,d_u)$, appearing much closer than they actually are. Lowering the modulation frequency $f_{mod}$ would allow to extend the unambiguous distance range $d_u$, results however in reduced precision of the distance measurement.

The ambiguity of the distance measurement may be overcome by performing additional ToF measurements at a different second modulation frequency. Referring back to FIGS. 1 and 2, the method 100 may optionally further comprise performing 106, by the ToF sensor 210, a plurality of second ToF measurements using a second modulation frequency to obtain second measurement values. The second modulation frequency is different from the first modulation frequency (e.g. higher or lower). Similar to what is described above for the first ToF measurements, a respective correlation function of each of the plurality of second ToF measurements is periodic and exhibits an increasing amplitude over distance within the measurement range of the ToF sensor 210. The step of determining 104 the distance of the ToF sensor 210 to the object 201 in the scene is then further based on the second measurement values.

Analogously to above mathematical expression (1), the second modulation frequency $f_{mod2}$ may be defined by the speed of light c and the period length $d_{period2}$ of the (light-intensity-independent) correlation functions of the plurality of second ToF measurements:

$$f_{mod2} = \frac{c}{2 \cdot d_{period2}} \tag{9}$$

Figure 8:
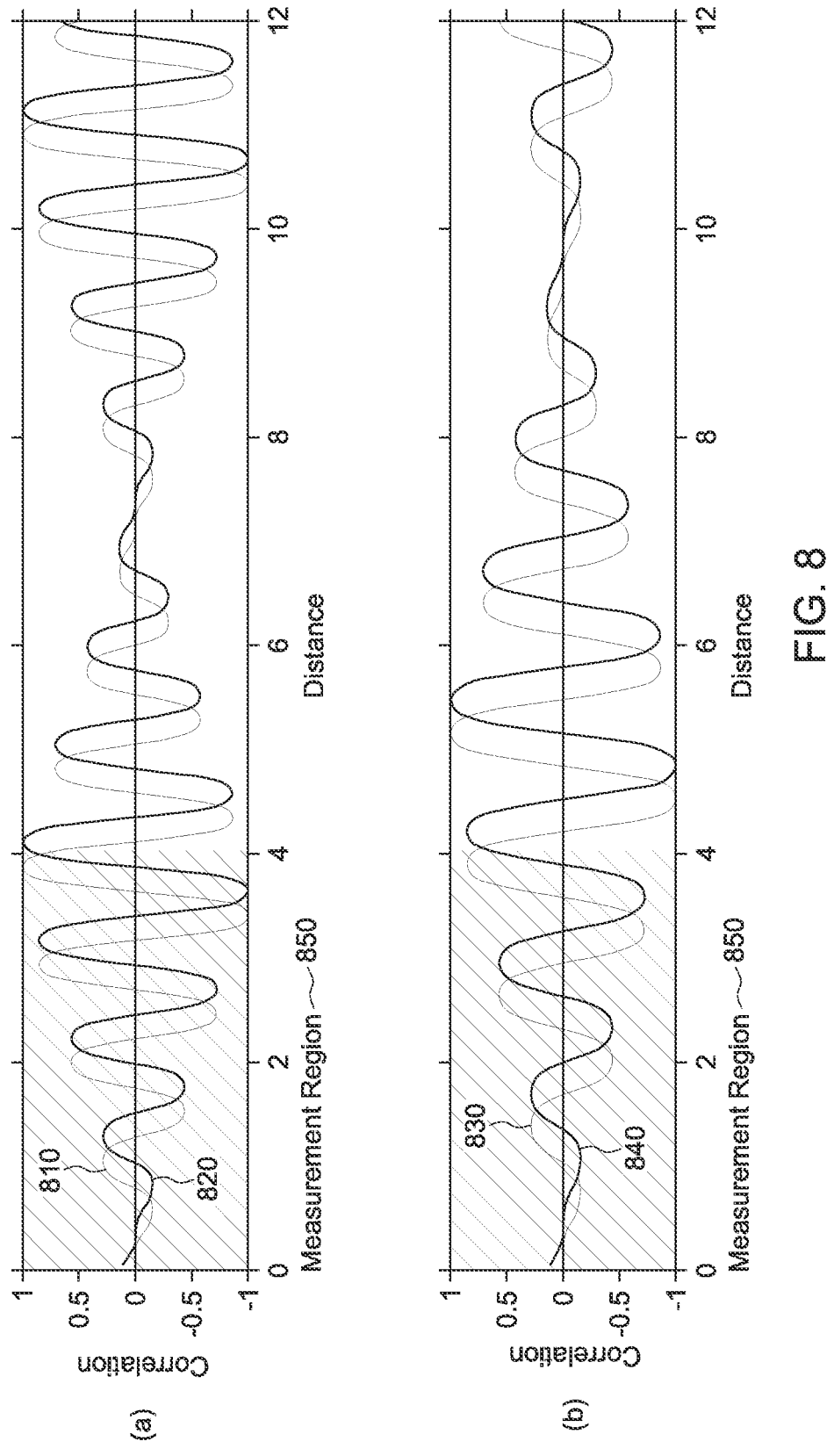
FIG. 8 illustrates exemplary correlation functions.

FIG. 8 illustrates in subfigure (a) two exemplary (light-intensity-independent) correlation functions 810 and 820 of two first ToF measurements by the ToF sensor 210. Further, FIG. 8 illustrates in subfigure (b) two exemplary (light-intensity-independent) correlation functions 830 and 840 of two second ToF measurements by the ToF sensor 210. The abscissa in each of the subfigures of FIG. 8 denotes the distance between the ToF sensor 210 and the object 201. The ordinate in each of the subfigures of FIG. 8 denotes the value of the respective correlation function. Further illustrated in FIG. 8 is an exemplary measurement range 850 of the ToF sensor 210.

The correlation functions 810 and 820 for the first modulation frequency $f_{mod1}$ as well as the correlation functions 830 and 840 for the second modulation frequency $f_{mod2}$ exhibit a sinusoidal, i.e. periodic, course (shape) with increasing amplitude over distance within the measurement range 850 of the ToF sensor 210. The correlation functions 810 and 820 exhibit the same first period length. The correlation functions 830 and 840 exhibit the same second period length.

Analogously to what is described above for the plurality of first ToF measurements, different time offsets are used respectively for the plurality of second ToF measurements between the respective sequence of modulated light pulses 202 emitted to the scene during the respective second ToF measurement and the respective reference signal used to drive the light capture element 220 of the ToF sensor 210 during the respective second ToF measurement. The time offsets used for the second ToF measurements are integer multiples of a fraction of a second period length $T_2$ given by the inverse of the second modulation frequency $f_{mod2}$, that is:

$$T_2 = \frac{1}{f_{mod2}} \tag{10}$$

For example, time offsets $n \cdot T_2/4$ with n=0, 1 may be used in case two second ToF measurements are performed. Similarly, time offsets $n \cdot T_2/4$ with n=0, 1, 2, 3 may be used in case four second ToF measurements are performed. The sequences of modulated light pulses 202 emitted to the scene during the second ToF measurements may be identical. Accordingly, the reference signals used for the second ToF measurements may time shifted by $n \cdot T_1/4$.

As described above, if the object 201 is located beyond the unambiguous distance $d_{u1}$ of the first ToF measurements, it is wrapped around to fall in the unambiguous distance range $[0,d_{u1})$ of the first ToF measurements. Analogously, if the object 201 is located beyond the unambiguous distance $d_{u2}$ of the second ToF measurements, it is wrapped around to fall in the unambiguous distance range $[0,d_{u2})$ of the second ToF measurements. Accordingly, the object 201 appears much closer than it actually is.

In other words, the plurality of first ToF measurements as well as the plurality of second ToF measurements each give a few possible distances for the object 201.

The possible distances of the object 201 to the ToF sensor 210 for the first ToF measurements is given by:

$$d_1 = \frac{c}{2} \cdot \frac{\varphi_1}{2\pi \cdot f_{mod1}} + k_1 \cdot \frac{c}{2 \cdot f_{mod1}} = \frac{c}{2} \cdot \frac{\varphi_1}{2\pi \cdot f_{mod1}} + k_1 \cdot d_{u1} \tag{11}$$

$\varphi_1$ denotes the phase value determined from the first measurement values according to, e.g., one of mathematical expressions (3) and (4). The first term of mathematical expression (11) corresponds to above mathematical expression (7). The second term of mathematical expression (11) is based on above mathematical expression (8) and describes that actual distance of the object 201 may be $k_1$ times the unambiguous distance $d_{u1}$ of the first ToF measurements greater than the distance determined according to mathematical expression (7) due to the phase wrapping, wherein $k_1=0, 1, 2, \ldots$.

Analogously, the possible distances of the object 201 to the ToF sensor 210 for the second ToF measurements is given by:

$$d_2 = \frac{c}{2} \cdot \frac{\varphi_2}{2\pi \cdot f_{mod2}} + k_2 \cdot \frac{c}{2 \cdot f_{mod2}} = \frac{c}{2} \cdot \frac{\varphi_2}{2\pi \cdot f_{mod2}} + k_2 \cdot d_{u2} \qquad (12)$$

$\varphi_2$ denotes the phase value determined from the second measurement values according to, e.g., one of mathematical expressions (3) and (4). The first term of mathematical expression (12) corresponds to above mathematical expression (7). The second term of mathematical expression (12) is based on above mathematical expression (8) and describes that actual distance of the object 201 may be $k_2$ times the unambiguous distance $d_{u2}$ of the second ToF measurements larger than the distance determined according to mathematical expression (7), wherein $k_2=0, 1, 2, \ldots$.

Figure 9:
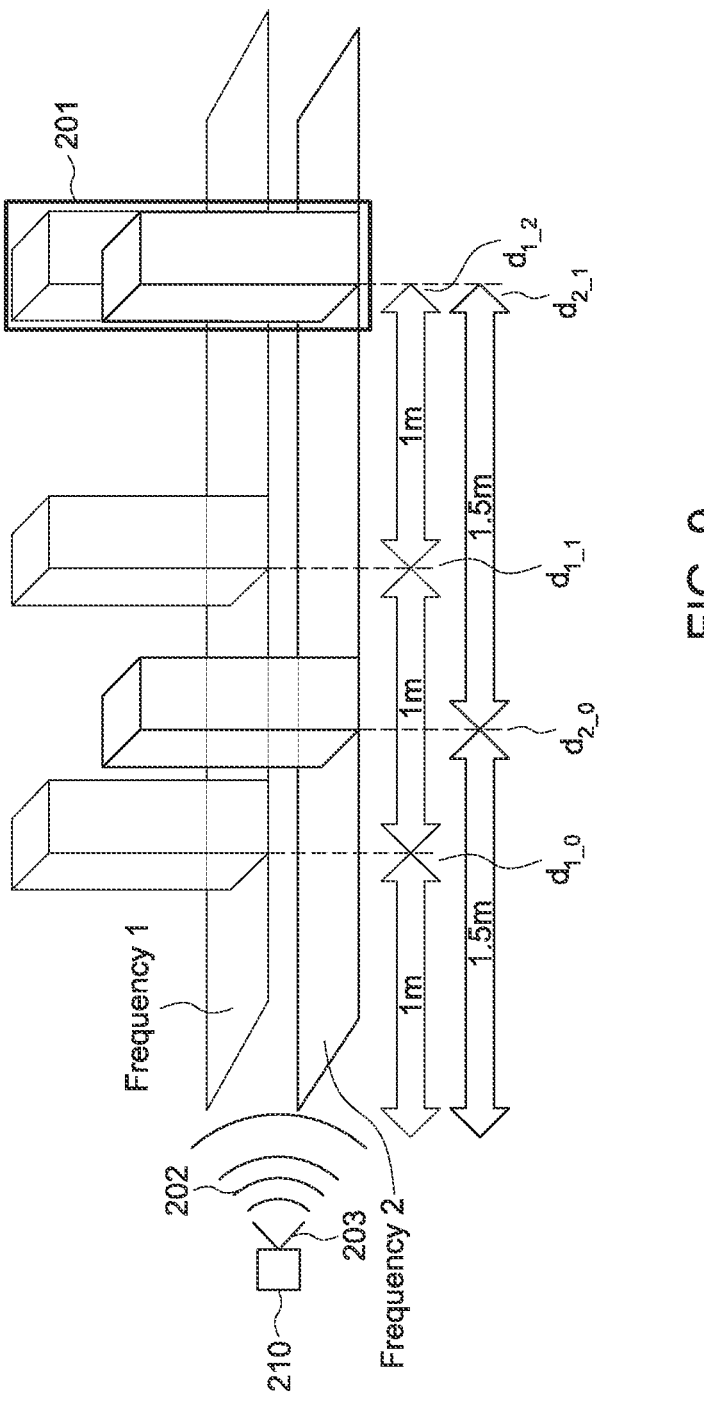
FIG. 9 illustrates an example of phase unwrapping.

This is exemplarily illustrated in FIG. 9. FIG. 9 illustrates the possible distances of the object 201 to the ToF sensor 210 for ToF measurements with two different modulation frequencies. The first modulation frequency is about 150 MHz such that the unambiguous distance dui of the first ToF measurements is 1 m. The second modulation frequency is about 100 MHz such that the unambiguous distance $d_{u2}$ of the second ToF measurements is 1.5 m.

The phase value $\varphi_1$ determined based on the first measurement values is such that the distance of the object 201 to the ToF sensor 210 is 1 m according to mathematical expression (7). This distance is denoted as distance $d_{1\_0}$ in FIG. 9. However, as indicated by mathematical expression (11), the distance of the object 201 to the ToF sensor 210 may as well be 1·1 m, 2·1 m, . . . greater. The possible distances for $k_1=1$ and $k_1=2$ are denoted as $d_{1\_1}$ and $d_{1\_2}$ in FIG. 9.

Analogously, the phase value $\varphi_2$ determined based on the second measurement values is such that the distance of the object 201 to the ToF sensor 210 is 1.5 m according to mathematical expression (7). This distance is denoted as distance $d_{2\_0}$ in FIG. 9. However, as indicated by mathematical expression (12), the distance of the object 201 to the ToF sensor 210 may as well be 1·1.5 m, 2·1.5 m, . . . greater. The possible distance for $k_2=1$ is denoted as $d_{2\_1}$ in FIG. 9.

The mathematical expressions (11) and (12) are only for one specific distance, i.e., for one specific value pair for the parameters $k_1$ and $k_2$ in agreement. For example, it may be determined for which integer values of the parameters $k_1$ and $k_2$ the distances $d_1$ and $d_2$ according to the mathematical expressions (11) and (12) are identical to each other or differ from each other by less than a threshold value (to account for the limited measurement precision). Accordingly, a first distance estimate $d_1$ may be determined according to mathematical expression (11) based on the first measurement values. Analogously, a second distance estimate $d_2$ may be determined according to mathematical expression (12) based on the second measurement values.

In the example of FIG. 9, the mathematical expressions (11) and (12) are only in agreement for $k_1=2$ and $k_2=1$ such that the first distance estimate $d_1=3$ m and also the second distance estimate $d_2=3$ m.

The distance d to the object 201 may be determined based on the first distance estimate $d_1$ and the second distance estimate $d_2$. For example, both distance estimates may be averaged to account for measurement errors of the plurality of first ToF measurements and the plurality of second ToF measurements:

$$d = \frac{d_1 + d_2}{2} \qquad (13)$$

In other examples, weighted averaging may be used:

$$d = w_1 \cdot d_1 + w_2 \cdot d_2 \qquad (14)$$

The weights $w_1$ and $w_2$ may be based on various parameters such as the first and second modulation frequencies or the amplitudes of the first and second measurement values.

The course (shape) of the (light-intensity-independent) correlation functions of the plurality of second ToF measurements may be adjusted analogously to what is described for the correlation functions of the plurality of ToF first measurements by means of the emitted modulated light pulses and the reference signals used for driving the light capture element 220. This will be described in the following for one of the second ToF measurements. It is to be noted that the aspects described in the following may be used as well for the other first ToF measurements.

Similar to what is described above, another sequence of modulated light pulses 202 is emitted to the scene when performing the second ToF measurement. The other sequence of modulated light pulses is a succession of light pulse sub-sequences of a third type and light pulse sub-sequences of a fourth type according to another modulation code. The light pulse sub-sequences of the third type and the light pulse sub-sequences of the fourth type are different from each other similar to what is described above. In particular, the light pulse sub-sequences of the third type each comprise light pulses at third positions of the respective light pulse sub-sequence of the third type (e.g. odd positions) and the light pulse sub-sequences of the fourth type each comprise light pulses only at positions of the respective light pulse sub-sequence of the fourth type that are different from the third positions (e.g. even positions). Pulse lengths and pulse spacings of the light pulse sub-sequences of the third and the fourth type are different from the pulse lengths and pulse spacings of the light pulse sub-sequences of the first and the second type due to the different modulation frequencies used for the plurality of first ToF measurements and the plurality of second ToF measurements. Other than that, the same principles as those described above for the light pulse sub-sequences of the first and the second type may be applied to the light pulse sub-sequences of the third and the fourth type.

Further, the light capture element 220 of the ToF sensor 210 is driven based on another reference signal when performing the second ToF measurement—similar to what is described above. The other reference signal comprises a succession of electric pulse sequences of a third type and electric pulse sequences of a fourth type according to the other modulation code. The electric pulse sequences of the third type and the electric pulse sequences of the fourth type are different from each other similar to what is described above. In particular, the electric pulse sequences of the third type each comprise high pulses at fourth positions of the respective electric pulse sequence of the third type (e.g. odd positions) and the electric pulse sequences of the fourth type each comprise high pulses only at positions of the respective electric pulse sequence of the fourth type that are different from the fourth positions (e.g. even positions). Pulse lengths of the high and low pulses in the electric pulse sequences of the third and the fourth type are different from the pulse lengths of the high and low pulses in the electric pulse sequences of the first and the second type due to the different modulation frequencies used for the plurality of first ToF measurements and the plurality of second ToF measurements. Other than that, the same principles as those described above for the electric pulse sequences of the first and the second type may be applied to the electric pulse sequences of the third and the fourth type.

The modulation code for the plurality of first ToF measurements and the other modulation code for the plurality of second ToF measurements may be identical to each other or be different from each other. The same other modulation code is used for the plurality of second ToF measurements. For example, the same modulation code is used for plurality of first ToF measurements and the plurality of second ToF measurements in the example of FIG. 8. As a consequence, the correlation functions 830 and 840 of the two second ToF measurements exhibit their highest amplitudes in a slightly different distance region than the correlation functions 810 and 820 of the two first ToF measurements.

It may be beneficial for the above described phase unwrapping to have the highest amplitudes of the correlation functions of both the first ToF measurements and the second ToF measurements in substantially the same distance region. The respective location of the highest amplitudes may be adjusted via the respective modulation code used for the plurality of first ToF measurements and the plurality of second ToF measurements. In other words, the modulation code for the plurality of first ToF measurements and the other modulation code for the plurality of second ToF measurements may be different from each other to shift the highest amplitudes of the respective correlation functions such that they are substantially the same distance region. For example, the correlation functions of the plurality of first ToF measurements may exhibit their respective maximum amplitude at first distances and the correlation functions of the plurality of second ToF measurements may exhibit their respective maximum amplitude at second distances such that the first distances differ by less than 20%, 10% or 5% from the second distances.

Figure 10:
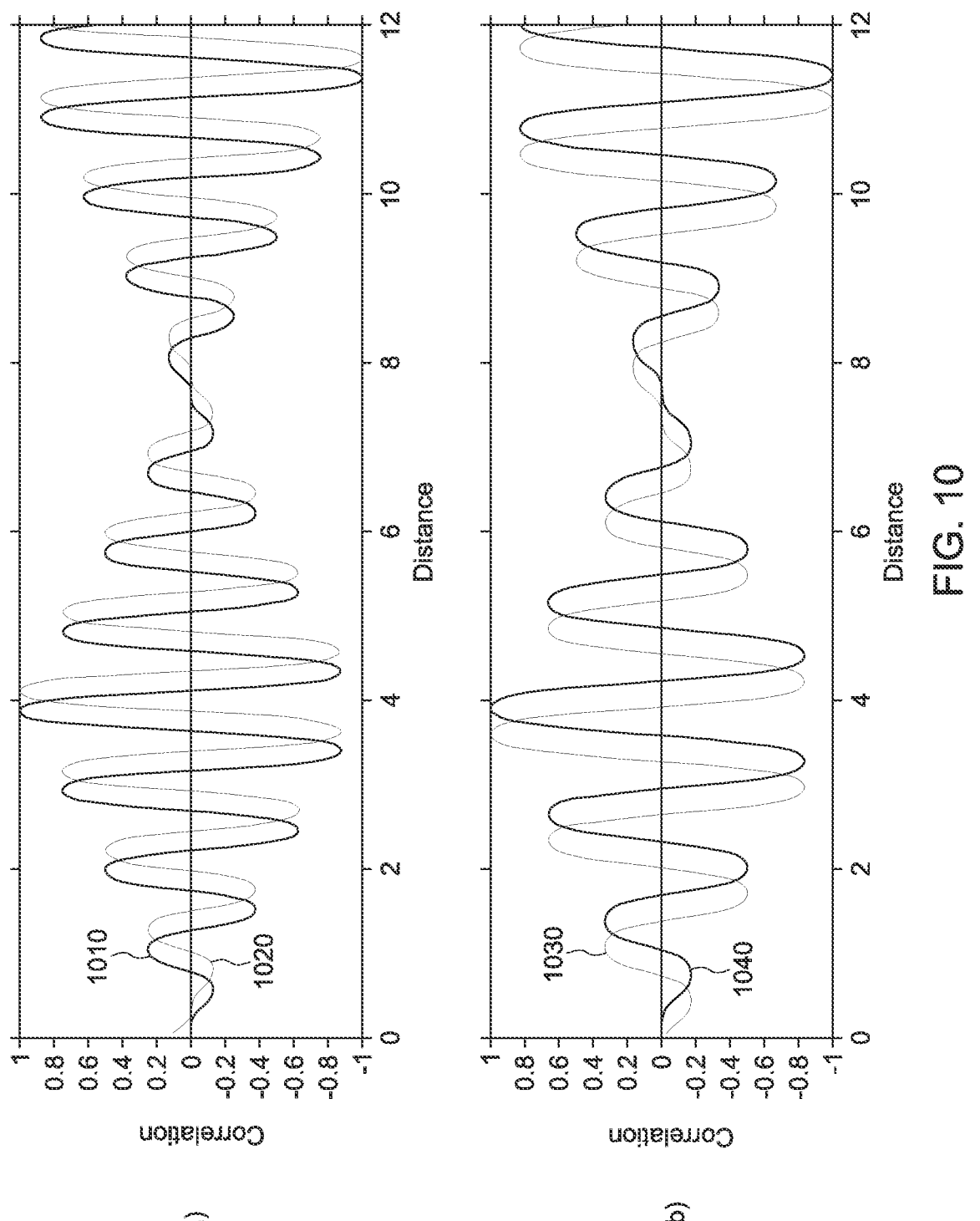
FIG. 10 illustrates exemplary correlation functions.

This is exemplarily illustrated in FIG. 10. FIG. 10 illustrates in subfigure (a) two exemplary (light-intensity-independent) correlation functions 1010 and 1020 of two first ToF measurements by the ToF sensor 210. Further, FIG. 10 illustrates in subfigure (b) two exemplary (light-intensity-independent) correlation functions 1030 and 1040 of two second ToF measurements by the ToF sensor 210. The abscissa in each of the subfigures of FIG. 10 denotes the distance between the ToF sensor 210 and the object 201. The ordinate in each of the subfigures of FIG. 10 denotes the value of the respective correlation function. The measurement range of the ToF sensor 210 is not explicitly illustrated in FIG. 10, but ranges from 0 to approx. 4.3 on the ordinate.

The correlation functions 1010 and 1020 for the first modulation frequency $f_{mod1}$ as well as the correlation functions 1030 and 1040 for the second modulation frequency $f_{mod2}$ exhibit a sinusoidal, i.e. periodic, course (shape) with increasing amplitude over distance within the measurement range of the ToF sensor 210.

A first modulation code is used for the two first ToF measurements and a different second is used for the two second ToF measurements. As can be seen from FIG. 10, the correlation functions 1010 and 1020 of the two first ToF measurements as well as the correlation functions 1030 and 1040 of the two second ToF measurements exhibit their respective highest amplitude at approx. distance 4 on the ordinate, i.e., at substantially the same distance.

Further, the modulation code for the plurality of first ToF measurements and the other modulation code for the plurality of second ToF measurements may be selected different from each other to ensure that the amplitudes of the correlation functions of the plurality of first ToF measurements and the amplitudes of the correlation functions of the plurality of second ToF measurements increase similarly (in a similar fashion) over distance.

The examples as described herein may be summarized as follows:

An example relates to a method for ToF sensing of a scene. The method comprises performing, by a ToF sensor, a plurality of first ToF measurements using a first modulation frequency to obtain first measurement values. A respective correlation function of each of the plurality of first ToF measurements is periodic and exhibits an increasing amplitude over distance within a measurement range of the ToF sensor. The method additionally comprises determining a distance to an object in the scene based on the first measurement values.

In some examples, different time offsets are used respectively for the plurality of first ToF measurements between a respective sequence of modulated light pulses emitted to the scene during the respective first ToF measurement and a respective reference signal used to drive a light capture element of the ToF sensor during the respective first ToF measurement.

According to some examples, the time offsets used for the ToF measurements are integer multiples of a fraction of a first period length given by the inverse of the first modulation frequency.

In some examples, the sequences of modulated light pulses emitted to the scene during the first ToF measurements are identical.

According to some examples, performing one of the first ToF measurements comprises emitting a sequence of modulated light pulses to the scene, wherein the sequence of modulated light pulses is a succession of light pulse sub-sequences of a first type and light pulse sub-sequences of a second type according to a modulation code, and wherein the light pulse sub-sequences of the first type each comprise light pulses at first positions of the respective light pulse sub-sequence of the first type and the light pulse sub-sequences of the second type each comprise light pulses only at positions of the respective light pulse sub-sequence of the second type that are different from the first positions.

In some examples, the light pulse sub-sequences of the first type each comprise a first number of light pulses, wherein at least one of the light pulse sub-sequences of the second type comprises a second number of light pulses different from the first number of light pulses.

According to some examples, performing the one of the first ToF measurements further comprises driving a light capture element of the ToF sensor based on a reference signal, wherein the reference signal comprises a succession of electric pulse sequences of a first type and electric pulse sequences of a second type according to the modulation code, and wherein the electric pulse sequences of the first type each comprise high pulses at second positions of the respective electric pulse sequence of the first type and the electric pulse sequences of the second type each comprise high pulses only at positions of the respective electric pulse sequence of the second type that are different from the second positions.

In some examples, at least one of the light pulse sub-sequences of the first type comprises a number of light pulses that is smaller than a respective number of high pulses in the electric pulse sequences of the first type, and/or at least one of the light pulse sub-sequences of the second type comprises a number of light pulses that is smaller than a respective number of high pulses in the electric pulse sequences of the second type.

According to some examples, a time span from a beginning of the at least one of the light pulse sub-sequences of the first type to a first light pulse in the at least one of the light pulse sub-sequences of the first type is longer than a time span from a beginning of one of the electric pulse sequences of the first type to a first high pulse in the one of the electric pulse sequences of the first type, and/or wherein a time span from a last light pulse in the at least one of the light pulse sub-sequences of the first type to an end of the at least one of the light pulse sub-sequences of the first type is longer than a time span from a last high pulse in the one of the electric pulse sequences of the first type to an end of the one of the electric pulse sequences of the first type.

In some examples, each of the light pulse sub-sequences of the first type and the light pulse sub-sequences of the second type exhibits a respective series of light pulses of equal pulse length, wherein a pulse spacing to a directly neighboring light pulse is $(2 \cdot m+1)$ times the pulse length for one or more of the light pulses in the respective series of light pulses, wherein $m \geq 1$, and wherein the pulse spacing to the directly neighboring light pulse is equal to the pulse length for the other light pulses in the respective series of light pulses.

According to some examples, the light pulse sub-sequences of the first type and the light pulse sub-sequences of the second type exhibit a same duty cycle.

In some examples, the method further comprises performing, by the ToF sensor, a plurality of second ToF measurements using a second modulation frequency to obtain second measurement values, wherein a respective correlation function of each of the plurality of second ToF measurements is periodic and exhibits an increasing amplitude over distance within the measurement range of the ToF sensor, and wherein determining the distance to the object in the scene is further based on the second measurement values.

According to some examples, determining the distance to the object in the scene comprises: determining a first distance estimate based on the first measurement values; determining a second distance estimate based on the second measurement values; and determining the distance to the object in the scene based on the first distance estimate and the second distance estimate.

In some examples, the correlation functions of the first ToF measurements exhibit their respective maximum amplitude at first distances, wherein the correlation functions of the second ToF measurements exhibit their respective maximum amplitude at second distances, and wherein the first distances differ by less than 20% from the second distances.

According to some examples, performing one of the second ToF measurements comprises: emitting another sequence of modulated light pulses to the scene, wherein the other sequence of modulated light pulses is a succession of light pulse sub-sequences of a third type and light pulse sub-sequences of a fourth type according to another modulation code, wherein the light pulse sub-sequences of the third type each comprise light pulses at third positions of the respective light pulse sub-sequence of the third type and the light pulse sub-sequences of the fourth type each comprise light pulses only at positions of the respective light pulse sub-sequence of the fourth type that are different from third positions.

In some examples, performing the one of the second ToF measurements further comprises: driving a light capture element of the ToF sensor based on another reference signal, wherein the other reference signal comprises a succession of electric pulse sequences of a third type and electric pulse sequences of a fourth type according to the other modulation code, wherein the electric pulse sequences of the third type each comprise high pulses at fourth positions of the respective electric pulse sequence of the third type and the electric pulse sequences of the fourth type each comprise high pulses only at positions of the respective electric pulse sequence of the fourth type that are different from the fourth positions.

Another example relates to an apparatus for ToF sensing of a scene. The apparatus comprises a ToF sensor configured to perform a plurality of first ToF measurements using a first modulation frequency to obtain first measurement values. A respective correlation function of each of the plurality of first ToF measurements is periodic and exhibits an increasing amplitude over distance within a measurement range of the ToF sensor. Additionally, the apparatus comprises a processing circuit configured to determine a distance to an object in the scene based on the first measurement values.

Examples of the present disclosure may enable ToF measurements with increasing correlation for glare reduction. ToF measuring with a correlation function that increases over distance may allow to omit object glare in close proximity. The present disclosure may enhance ToF sensing for many applications such as, e.g., long-range ToF sensing at the front-side of vehicles (cars).

The aspects and features described in relation to a particular one of the previous examples may also be combined with one or more of the further examples to replace an identical or similar feature of that further example or to additionally introduce the features into the further example.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A method for Time-of-Flight (ToF) sensing of a scene, the method comprising:

performing, by a ToF sensor, a plurality of first ToF measurements using a first modulation frequency to obtain first measurement values, wherein a respective correlation function of each of the plurality of first ToF measurements is periodic and exhibits an increasing amplitude over distance within a measurement range of the ToF sensor; and determining a distance to an object in the scene based on the first measurement values.

2. The method of claim 1, wherein different time offsets are used respectively for the plurality of first ToF measurements between a respective sequence of modulated light pulses emitted to the scene during the respective first ToF measurement and a respective reference signal used to drive a light capture element of the ToF sensor during the respective first ToF measurement.

3. The method of claim 2, wherein the time offsets used for the ToF measurements are integer multiples of a fraction of a first period length given by the inverse of the first modulation frequency.

4. The method of claim 2, wherein the sequences of modulated light pulses emitted to the scene during the first ToF measurements are identical.

5. The method of claim 1, wherein performing one of the first ToF measurements comprises:

emitting a sequence of modulated light pulses to the scene, wherein the sequence of modulated light pulses is a succession of light pulse sub-sequences of a first type and light pulse sub-sequences of a second type according to a modulation code, wherein the light pulse sub-sequences of the first type each comprise light pulses at first positions of the respective light pulse sub-sequence of the first type and the light pulse sub-sequences of the second type each comprise light pulses only at positions of the respective light pulse sub-sequence of the second type that are different from the first positions.

6. The method of claim 5, wherein the light pulse sub-sequences of the first type each comprise a first number of light pulses, and wherein at least one of the light pulse sub-sequences of the second type comprises a second number of light pulses different from the first number of light pulses.

7. The method of claim 5, wherein performing the one of the first ToF measurements further comprises:

driving a light capture element of the ToF sensor based on a reference signal, wherein the reference signal comprises a succession of electric pulse sequences of a first type and electric pulse sequences of a second type according to the modulation code, wherein the electric pulse sequences of the first type each comprise high pulses at second positions of the respective electric pulse sequence of the first type and the electric pulse sequences of the second type each comprise high pulses only at positions of the respective electric pulse sequence of the second type that are different from the second positions.

8. The method of claim 7, wherein at least one of the light pulse sub-sequences of the first type comprises a number of light pulses that is smaller than a respective number of high pulses in the electric pulse sequences of the first type, and/or wherein at least one of the light pulse sub-sequences of the second type comprises a number of light pulses that is smaller than a respective number of high pulses in the electric pulse sequences of the second type.

9. The method of claim 8, wherein a time span from a beginning of the at least one of the light pulse sub-sequences of the first type to a first light pulse in the at least one of the light pulse sub-sequences of the first type is longer than a time span from a beginning of one of the electric pulse sequences of the first type to a first high pulse in the one of the electric pulse sequences of the first type, and/or wherein a time span from a last light pulse in the at least one of the light pulse sub-sequences of the first type to an end of the at least one of the light pulse sub-sequences of the first type is longer than a time span from a last high pulse in the one of the electric pulse sequences of the first type to an end of the one of the electric pulse sequences of the first type.

10. The method of claim 5, wherein each of the light pulse sub-sequences of the first type and the light pulse sub-sequences of the second type exhibits a respective series of light pulses of equal pulse length, wherein a pulse spacing to a directly neighboring light pulse is $(2 \cdot m+1)$ times the pulse length for one or more of the light pulses in the respective series of light pulses, wherein $m \geq 1$, and wherein the pulse spacing to the directly neighboring light pulse is equal to the pulse length for the other light pulses in the respective series of light pulses.

11. The method of claim 5, wherein the light pulse sub-sequences of the first type and the light pulse sub-sequences of the second type exhibit a same duty cycle.

12. The method of claim 1, further comprising:

performing, by the ToF sensor, a plurality of second ToF measurements using a second modulation frequency to obtain second measurement values, wherein a respective correlation function of each of the plurality of second ToF measurements is periodic and exhibits an increasing amplitude over distance within the measurement range of the ToF sensor, wherein determining the distance to the object in the scene is further based on the second measurement values.

13. The method of claim 12, wherein determining the distance to the object in the scene comprises:

determining a first distance estimate based on the first measurement values;

determining a second distance estimate based on the second measurement values; and determining the distance to the object in the scene based on the first distance estimate and the second distance estimate.

14. The method of claim 12, wherein the correlation functions of the first ToF measurements exhibit their respective maximum amplitude at first distances, wherein the correlation functions of the second ToF measurements exhibit their respective maximum amplitude at second distances, and wherein the first distances differ by less than 20% from the second distances.

15. The method of claim 12, wherein performing one of the second ToF measurements comprises:

emitting another sequence of modulated light pulses to the scene, wherein the other sequence of modulated light pulses is a succession of light pulse sub-sequences of a third type and light pulse sub-sequences of a fourth type according to another modulation code, wherein the light pulse sub-sequences of the third type each comprise light pulses at third positions of the respective light pulse sub-sequence of the third type and the light pulse sub-sequences of the fourth type each comprise light pulses only at positions of the respective light pulse sub-sequence of the fourth type that are different from the third positions.

16. The method of claim 15, wherein performing the one of the second ToF measurements further comprises:

driving a light capture element of the ToF sensor based on another reference signal, wherein the other reference signal comprises a succession of electric pulse sequences of a third type and electric pulse sequences of a fourth type according to the other modulation code, wherein the electric pulse sequences of the third type each comprise high pulses at fourth positions of the respective electric pulse sequence of the third type and the electric pulse sequences of the fourth type each comprise high pulses only at positions of the respective electric pulse sequence of the fourth type that are different from the fourth positions.

17. An apparatus for Time-of-Flight (ToF) sensing of a scene, the apparatus comprising:

a ToF sensor configured to perform a plurality of first ToF measurements using a first modulation frequency to obtain first measurement values, wherein a respective correlation function of each of the plurality of first ToF measurements is periodic and exhibits an increasing amplitude over distance within a measurement range of the ToF sensor; and a processing circuit configured to determine a distance to an object in the scene based on the first measurement values.

* * * * *